(12) United States Patent
Belsey et al.

(10) Patent No.: US 8,719,844 B2
(45) Date of Patent: May 6, 2014

(54) MERGING REALTIME DATA FLOWS

(75) Inventors: James Belsey, London (GB); Anders Aaltonen, London (GB)

(73) Assignee: Morgan Stanley, New York, NY (US)

( * ) Notice: Subject to any disclaimer, the term of this patent is extended or adjusted under 35 U.S.C. 154(b) by 1552 days.

(21) Appl. No.: 11/604,561

(22) Filed: Nov. 27, 2006

(65) Prior Publication Data

US 2008/0127211 A1 May 29, 2008

(51) Int. Cl.
*G06F 9/54* (2006.01)
*G06F 13/00* (2006.01)

(52) U.S. Cl.
USPC .......................................... 719/315; 719/313

(58) Field of Classification Search
None
See application file for complete search history.

(56) References Cited

U.S. PATENT DOCUMENTS 5,606,693 A * 2/1997 Nilsen et al. .................... 1/1

FOREIGN PATENT DOCUMENTS

| EP | 0924613 A2 | 6/1999 |
|---|---|---|
| EP | 0924613 A3 | 11/2004 |

OTHER PUBLICATIONS

Michael Gertz; Oracle/SQL Tutorial; Jan. 2000; 66 Pages.*
Thomas M. Connolly, Carolyn E. Begg; Database Systems: A Practical Approach to Design, Implementation and Management; Addison Wesley; 4 edition (May 27, 2004); 11 Pages.*
Tore Bostrup; Introduction to Relational Databases—Part 1: Theoretical Foundation; retrieved Oct. 5, 2010; archived Jan. 27, 2005; 13 Pages.*
Jennifer Ball, Debbie Carson, Ian Evans, Scott Fordin, Kim Haase, Eric Jendrock; The Java™ EE 5 Tutorial; Sun Microsystems; Jun. 16, 2006; 33 Pages.*
European Search Report mailed May 27, 2009 for European Application No. 07115325.8, 9 pages.
Object Query Service Submitted in Response to OMG OSTF RFP4 by Itasca Objectivity, Inc., Jul. 19, 1994, O2, Ontos, Servio, SunSoft; Drew Wade and Jeff Eastman Editors, Sep. 23, 1994, pp. 1-23.
Stephen M. Watt, A Technique for Generic Iteration and Its Optimization, International Conference on Functional Programming, Proceedings of the 2006 Sigplan Workshop on Generic Programming, Sep. 16, 1996, Portland, Oregon, pp. 76-86.
Gamma et al., Design Patterns—Elements of Reusable Object-Oriented Software, Jan. 1, 1995, Chapter 5, pp. 257-271.

* cited by examiner

*Primary Examiner* — H S Sough
*Assistant Examiner* — Kimberly Jordan
(74) *Attorney, Agent, or Firm* — K&L Gates LLP

(57) ABSTRACT

A method, apparatus and system to receive at a first message source a first message in a first data flow from a first messaging layer, provide data wrapped in a first data message reconfigurable iterator from the first message source to a first table in the primary data flow and provide a first constrained view over the first table.

17 Claims, 7 Drawing Sheets

FIG. 7

MERGING REALTIME DATA FLOWS

CROSS-REFERENCE TO RELATED APPLICATION

N/A

FIELD

Digital data processing and more particularly to an application framework employing reconfigurable objects and merging realtime data flows.

BACKGROUND

Computer application programs are becoming increasingly large and complex as application developers adopt standard frameworks for constructing applications and developing software. Typically, code developed by a software developer forms only a small portion of the overall application functionality. An application framework is a software component which can be added to an existing operating system to provide a large body of pre-coded solutions to common program requirements, and to manage the execution of programs written specifically for the framework. Correspondingly, the extent to which code uses the services provided by the application framework has become critical to the overall performance in the operation of the system. Frequently, however, the framework is used inefficiently or incorrectly.

The application framework also provides a reconfigurable design for the software systems (or subsystems). The application framework may be expressed as a set of abstract classes and the way their instances collaborate for a specific type of software. Application frameworks are object-oriented designs and may be implemented in an object-oriented language. For example, the application framework may be directed toward building specific applications, compilers for different programming languages and target machines, financial modeling applications or decision support systems. Application frameworks define the places in the architecture where adaptations for specific functionality should be made. In an object-oriented environment, an application framework includes abstract and concrete classes. Instantiation of such a framework includes composing and sub-classing the existing classes. A good application framework enables developers to spend more time concentrating on the business-specific problems at hand rather than on the code running behind it.

The pre-coded solutions provided by the application framework form a class library of the framework to support the development of user interfaces, data access, cryptography, web application development, numeric algorithms and network communications. The functions of the class library are combined with the custom code created by the software developers to produce custom applications programs developed for the framework.

These applications execute in a software environment that manages the runtime requirements of the program. A runtime system, which also forms a portion of the framework, provides the appearance of an application virtual machine so that software developers need not consider the capabilities of the specific central processing unit (CPU) that ultimately will execute the program code. The class library and the run time requirements together compose the framework. The framework is a tool for simplifying the development of computer applications and to reduce the vulnerability of applications and computers to security threats.

Enterprise software includes commercial software such as sophisticated financial systems, popular websites and large scale management and administration systems. Modern enterprise software systems are generally based on standardized multi user application server software for which there are currently two main frameworks: the Java-based J2EE (Java 2 platform, Enterprise Edition) framework and the .NET framework by Microsoft®. Both aim to reduce cost and development time for large scale software development.

The application framework may provide the necessary functionality to achieve these goals through various libraries. A central design principle of an application framework is to handle caching of N-dimensional data. In certain implementations, for example, two-dimensional (2D) data is received from a back-end service and loses its rectangular form within the context of the application framework. The rectangular form of the data then has to be restored in the top-level library before being delivered to a client application.

The problem that recurs in many applications is the need to view the data that is arriving in a low level (sometimes raw binary) structure from a high level view, for example, to view the data as though it was a table or the contents of a table. This rectangular form of data consists of rows and columns and is a very common way for both humans and machines to view large datasets.

SUMMARY

In one embodiment, receiving at a first message source a first message in a first data flow from a first messaging layer; providing data wrapped in a first data message reconfigurable iterator from the first message source to a first table in the primary data flow; and providing a first constrained view over the first table.

BRIEF DESCRIPTION OF THE DRAWINGS

FIG. 7 is a diagram that represents one embodiment of data that has been represented to the client via iterators.

DESCRIPTION

Figure 1:
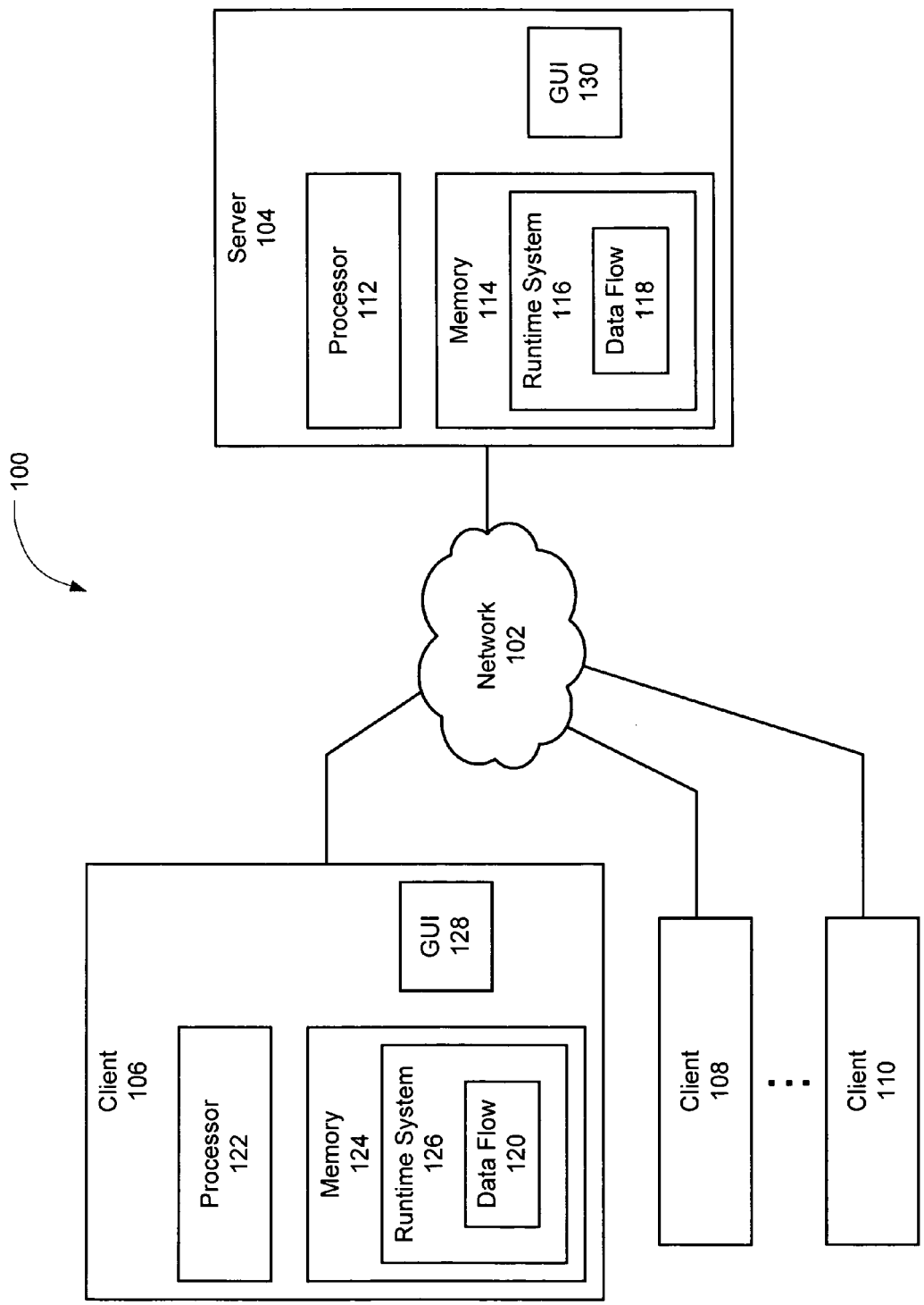
FIG. 1 illustrates a client/server system in which a network links a server to one or more client systems.

FIG. 1 illustrates a client/server system 100 in which a network 102 links a server 104 to one or more client systems 106, 108, 110. The server 104 is a programmable data processing system or computer suitable for implementing apparatuses, programs or methods in accordance with the embodiments described herein. The server 104 provides a core operating environment for one or more runtime systems that process user requests. The server 104 includes a processor 112 and a memory 114. The server also may include a graphical user interface (GUI) display 130 portion. The memory 114 can be used to store an operating system, a Transmission Control Protocol/Internet Protocol (TCP/IP) stack for communicating over the network 102, and machine-executable instructions executed by the processor 112. In some implementations, the server 104 can include multiple processors, each of which can be used to execute machine-executable instructions. The memory 114 can include a shared memory area that is accessible by multiple operating system processes executing in the server 104. An example of the server 104 suitable to be used in the client/server system 100 is a Java 2 Platform or a .NET Platform compatible server.

Although shown here with reference to the client system 106, each of the client systems 106, 108, 110 may include a processor 122 and a memory 124. The client systems 106, 108, 110 may be programmable data processing systems or computers suitable for implementing apparatuses, programs or methods in accordance with the embodiments described herein. The memory 124 can be used to store an operating system, a TCP/IP stack for communicating over the network 102, and machine-executable instructions executed by the processor 122. In some implementations, the client 106 can include multiple processors, each of which can be used to execute machine-executable instructions. The memory 124 can include a shared memory area that is accessible by multiple operating system processes executing in the client 106.

The client systems 106, 108, 110 can execute multiple applications or application interfaces. Each instance of an application or an application interface can constitute a user session. Each user session can generate one or more requests to be processed by the server 104. The requests can include instructions or code to be executed on a runtime system 116, 126 (e.g., a virtual machine) on the server 104 or any of the clients 106, 108, 110. The runtime system 116, 126 is a code execution environment that executes instructions or code in user requests and provides runtime services for that code. Core runtime services can include functionality such as process, thread and memory management (e.g., laying out objects in the server memory 114 sharing objects, managing references to objects and garbage collecting objects). Enhanced runtime services can include functionality such as error handling and establishing security and connectivity. Realtime data flow 118, 120 comprising a message source, a table and a view realtime may be established from the network 102 to a GUI display 128 portion of the client systems 106, 108, 110 and/or a GUI display 130 portion of the server 104. Several embodiments of realtime data flows 118, 120 are described in more detail below in FIGS. 2-5.

The runtime system 116 may be implemented as a .NET framework by Microsoft® or as a Java-based J2EE (Java 2 platform) framework, among others, for example.

In one embodiment, the runtime system 116 may be implemented as a .NET framework. The .NET framework may comprise a managed programming model for Microsoft® Windows® and may comprises Microsoft .NET Framework 3.0, .NET Framework 2.0, Windows Presentation Foundation, Windows Communication Foundation and Windows Workflow Foundation, among others, for example. The code for the .NET framework may comprise one or more of the following languages: Visual Basic, C# and C++. The .NET framework enables locating and viewing of samples, organized by technology, by opening the samples node in the TOC. "Technology Samples" sub-nodes may comprise samples that are generally brief and focused around a particular aspect of a technology. The "Application Samples" sub-nodes may comprise samples that are larger and more complex applications that demonstrate how to use the application programming interface (API) to construct a rich real-world application.

The .NET framework provides software components to connect users, systems and devices. The .NET framework spans the clients 106, 108, 110, the server 104 and the developer tools. The .NET framework may be implemented as an integral portion of the server 104 operating system forming a software development foundation. The .NET framework provides a unifying, object-oriented development environment based one or more Internet (e.g., TCP/IP) protocols and message formatting standards as well as application and component interoperability. Developers may employ the .NET framework set of software development tools to create and deploy interconnected .NET applications within intranet and extranet environments, or global networks across the Internet.

In one embodiment, the runtime system 116 may be implemented as a Java-based J2EE (Java 2 platform) framework virtual machine (VM). A VM is an abstract machine that can include an instruction set, a set of registers, a stack, a heap and a method area, like a real machine or processor. A VM essentially acts as an interface between program code and the actual processor or hardware platform on which the program code is to be executed. The program code includes instructions from the VM instruction set to manipulate the resources of the VM. The VM executes instructions on the processor or hardware platform on which the VM is running and manipulates the resources of that processor or hardware platform, so as to effect the instructions of the program code. In this way, the same program code can be executed on multiple processors or hardware platforms without having to be rewritten or re-compiled for each processor or hardware platform. Instead, a VM is implemented for each processor or hardware platform and the same program code can be executed in each VM. The implementation of a VM can be in code that is recognized by the processor or hardware platform. Alternatively, the implementation of a VM can be in code that is built directly into the processor 112.

As an example, a Java source program can be compiled into program code known as bytecode. Bytecode can be executed on a Java VM running on any processor or platform. The Java VM can either interpret the bytecode one instruction at a time, or the bytecode can be further compiled for the real processor or platform using a just-in-time (JIT) compiler.

In addition to Java VMs, other examples of VMs include Advanced Business Application Programming language (ABAP) VMs and Common Language Runtime (CLR) VMs. ABAP is a programming language for developing applications for the SAP R/3 system, a widely installed business application system developed by SAP. The Common Language Runtime is a managed code execution environment developed by Microsoft® Corporation of Redmond, Wash. For purposes of simplicity, the discussion in this specification focuses on virtual machines, but it is to be understood that the techniques described herein can also be used with other types of runtime systems.

When executing, the runtime system 116, 126 creates and references local data entities. Many different types of local entities can be created, including, for example, strings, constants and variables, objects that are instances of a class, runtime representations of a class and class loaders that are used to load class runtime representations.

When a local entity is no longer being used by the runtime system 116, 126 the memory being used to store the local entity needs to be reclaimed, i.e., freed or otherwise released and returned to the pool of available memory, so that it can be used to store new data entities. In some environments, developers must explicitly reclaim the memory they have allocated for local entities (e.g., by explicitly calling functions to free specified sections of memory). In other environments, the reclamation of memory is handled through a technique known as garbage collection.

Garbage collection is a process designed to identify and reclaim blocks of memory that have been dispensed by a memory allocator but that are no longer "live" (i.e., no longer being used, as determined, for example, by not being reachable from any currently referenced objects or entities). Garbage collection can sometimes be handled as a background task by runtime systems rather than as an explicit task by user programs. Garbage collection can also be handled as an inlined task.

Systems that reclaim memory through garbage collection provide several advantages over systems that leave reclamation up to users. In particular, systems that use garbage collection tend to be more reliable because they help to eliminate common programming problems such as dangling pointers and memory leaks. There are some costs associated with garbage collection, however, as access to memory must typically be restricted and runtime systems must sometimes be halted, at least during some portion of the garbage collection process. Nevertheless, garbage collection is frequently used to reclaim memory in runtime systems and there are many known garbage collection algorithms (e.g., reference counting, mark-sweep, mark-compact and copying algorithms).

Multiple runtime systems 116, 126 can be executed in parallel in order to increase the performance and scalability of the server 104 environments and/or the client systems 106, 108, 110. Sharing entities between the runtime systems 116, 126 can reduce resource (e.g., memory) and time consumption when multiple runtime systems 116, 126 are executed in parallel. There are multiple known techniques that can be used to share entities, and many different types of entities can be shared (including for example strings, constants, variables, object instances, class runtime representations and class loaders).

The lifetime of shared entities may be different than the lifetime of local entities, and as such, it may not be possible to use standard garbage collection techniques to reclaim memory that is being used to store shared entities. For example, it may not be possible to use a local garbage collection process for garbage collection of shared entities. A local garbage collection process, which is normally used to reclaim local memory (e.g., memory being used to store local entities associated with one runtime system), is typically designed to garbage collect a data entity when that runtime system no longer references the data entity. However, a shared entity should not necessarily be garbage collected when one runtime system no longer references the shared entity, as other runtime systems may still be referencing the shared entity. Garbage collection of shared entities thus requires some coordination and cooperation between participating runtime systems 116, 126.

For the client systems 106 108, 110 operating within the .NET framework runtime system 126, data may be routed from a back-end service (e.g., publish and subscribe systems or simple object access protocol [SOAP] service) into a front-end grid or the GUI display 128 where the data may be displayed to an end-user, for example, after business logic, formatting and other processing have been applied to the data. For example, the data may be routed from the SOAP, a lightweight extensible markup language (XML)-based messaging protocol used to encode the information in Web service request and response messages, before sending them over the network 102. SOAP messages are independent of any operating system or protocol and may be transported using a variety of Internet protocols, including SMTP, MIME and HTTP, among others.

The application framework for the system 100 and/or the server 104 and/or the client systems 106, 108, 110 may comprise applications that support messaging, caching and routing of realtime N-dimensional data across the network 102. For example, messaging may occur between the server 104 and the one or more client systems 106, 108, 110 across the network 102. An optimized and extended application framework may provide a suitable application framework to process 2D data. The embodiments, however, are not limited in this context.

In certain implementations, the application framework receives 2D data from a back-end service such as a messaging layer. In the process, the 2D may lose its rectangular form (see, for example, FIG. 7 and future descriptions of the data 702-1, 702-2) within the context of the application framework. The rectangular form of the data then has to be restored in a top-level library before being delivered to any of the client systems 106, 108, 110. The data structures employed within the application framework to support caching of N-dimensional data, however, may not be optimal for the 2D data case. Accordingly, an extended application framework may be adapted to restore the rectangular form of the data within the context of the application framework. The extended application framework also may maintain the rectangular form of the data throughout an entire data flow 118, 120 from a messaging source at the server 104 to the client systems 106, 108, 110. The extended application framework enables the shape or form of the data to be fixed and thus may be relied upon to make the internal data structures as efficient as possible. Throughout this description, the extended application framework and the application framework are generally referred to as the application framework.

In one embodiment, a developer may employ the resources provided by the application framework to setup realtime data flows 118, 120 from the network 102 socket straight to the GUI display 128 portion of the client systems 106, 108, 110 and/or the GUI display 130 portion the server 104. A network socket is a computer communications end point for new incoming connections from the network 102. A network socket at the client systems 106, 108, 110 and the server 104 accepts incoming connections from the network 102, handles lower-level traffic in the network 102 to finalize the connection and then forks a new connection for reading or writing. The server 104 socket continues to be available to accept other incoming connections from the network 102.

In one embodiment, the application framework may employ a generic layering framework to be as flexible and configurable as possible, with several realtime data flow 118, 120 components already provided. In general, these realtime data flows 118, 120 may resemble data flows associated with a database like structure, with tables of data and views over these tables. The data flows may be joined or merged by the application framework. For example, the application framework may provide a merger or inner join component to join the realtime data flows 118, 120 from multiple sources into a single coherent logical rectangular view.

Figure 2:
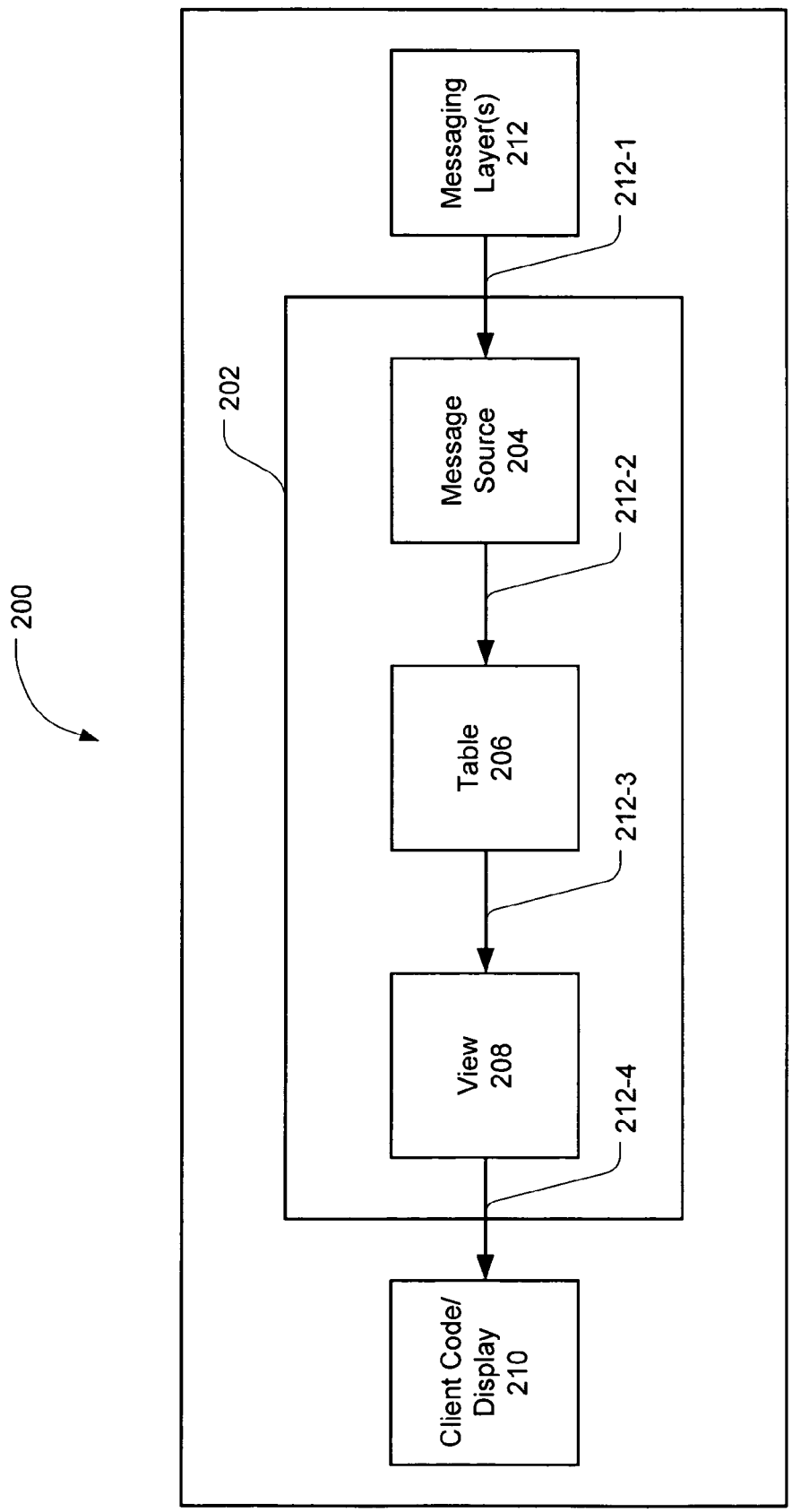
FIG. 2 is a block diagram illustrating one embodiment of a data flow on a runtime system in an application framework.

FIG. 2 is a block diagram 200 illustrating one embodiment of a data flow 202 on the runtime system 116, 126 in an application framework. In one embodiment, the data flow 202 may be a realtime data flow in the runtime system 116, 126. The application framework architectural components of the data flow 202 may comprise a message source 204, a table 206 and a view 208. The data flow 202 is set up between a messaging layer 212 and a client code/display 210, which are outside of the application framework. The output of the application framework may be to the client code/display 210, which may comprise a display or a computing process outside of the application framework, for example. The client code/display 210 enables the viewing of virtual rectangular data created within the application framework. For example, as the data received from the messaging layer(s) 212 loses its rectangular form, the data flow 202 restores the rectangular form in a virtual manner such that the data looks rectangular and gives the illusion of the rectangular form to the client code/display 210. As described below, other data flows may be implemented in the application framework in the runtime systems 116, 126. Therefore, the embodiments are not limited in this context.

The first component of the data flow 202 is the message source 204. The message source 204 receives information or data from an underlying messaging mechanism (e.g., an XML Reader for XML, a byte array from a realtime data system, etc.) shown as the messaging layer(s) 212. The information from the messaging layer(s) 212 is transferred to the message source 204 in the form of a reconfigurable object 212-1. Rather than creating a new object for every message coming from the messaging layer(s) 212, the same reconfigurable object 212-1 can be reused. The reconfigurable object 212-1 may be considered a construct that can have its internal content reconfigured to look like another instance of that construct. Accordingly, the reconfigurable object 212-1 may have its internal state changed such that it behaves like a completely different object. Because the reconfigurable object 212-1 can have its internal content reinitialized it prevents the creation of another object. Accordingly, the garbage collection process does less work and the overall performance of the data flow 202 is improved.

The message source receives the reconfigurable object 212-1 from the messaging layer(s) 212 and transfers a reconfigurable object 212-2 to the table 206. The message source 204 acts as an adapter between the specific client code/display 210 implementation (e.g., real time publish and subscribe, SOAP, etc.) and the data flow 202. The message source 204 maps the data flow 202 reconfigurable object construct 212-2, 212-3, 212-4 to and from the equivalent reconfigurable object constructs from the client code/display 210. A real time update in the application framework may be represented as a key, and thus the message source 204 maps the keys to software development process representations for subscriptions and maps the software development process representations for subscriptions to keys on data updates.

The next component in the data flow 202 is the table 206, which is a core structural entity of the data flow 202 in the application framework. The table receives the reconfigurable object 212-2 from the message source 204 and transfers a reconfigurable object 212-3 to the view 208. The table 206 is a set of data elements (values) and is organized using a model of horizontal rows and vertical columns. The columns are identified by name, and the rows are identified by the values appearing in a particular column subset which has been identified as a candidate key. The table 206 may refer to, for example, a relational table. The table 206 has a specified number of columns but can have any number of rows. In addition to the actual data rows, the table 206 may be associated with some meta-information, such as constraints placed on the table 206 or on the values within the particular columns. The data contained in the table 206 does not have to be physically stored in a database. In one embodiment the table 206 routes the data without caching the data for future reference.

The table 206 maintains the union of all subscriptions (keys and columns as described in more detail below) in all attached views in the data flow 202 and is responsible for imposing this structure on incoming updates to the table 206. The table 206 is responsible for determining which parts of any update the client code/display 210 has actually registered for and then only dispatching those parts. As described in more detail below, the table 206 can be caching or non-caching.

The final component of the data flow 202 is the view 208. The view receives the reconfigurable object 212-3 from the table 206 and transfers a reconfigurable object 212-4 to the client code/display 210 outside the application framework. The view 208 in the data flow 202 within the run time system 116 application framework is a flow construct that can be used to restrict, transform or enrich data as it propagates through the data flow 202 in the form of reconfigurable objects 212-2, 212-3, 212-4. The view 208 illustrated in FIG. 2 is the most basic view. The view 208 is a view over the table 206. The view 208 provides a constrained "view" over the table 206. The view 208 limits the visible rows/keys and columns. The view 208 also may be considered a relational table and calculates the initial data at query time and then proceeds to update the data set based on updates provided by the lower layers. In general, the view 208 can constrain, enrich or add to data flowing through the update path. In one embodiment, when the view 208 constrains the data, it presents only a subset of the data available in the table 206. Nevertheless, the view 208 may allow a user to associate user-specific or even calculated data with update data.

In one embodiment, the realtime data is passed between the message source 204, the table 206 and the view 208 components within the data flow 202 by encapsulating the data in the reconfigurable objects 212-2, 212-3, 212-4 in the form of reconfigurable iterators. A reconfigurable iterator also may be considered to be a reconfigurable object. For example, a reconfigurable iterator may be a reconfigurable object that enables the traversal through all elements of a collection, regardless of its specific implementation. An iterator may sometimes be referred to as a cursor, especially within the context of a database. As described above with respect to reconfigurable objects, reconfigurable iterators may be lightweight and can be readily re-initialized with new data without incurring memory allocations. A reconfigurable iterator may be thought of as a type of pointer, which has two primary operations: (1) referencing one particular element in the collection object (called element access); and (2) modifying itself so it points to the next element (called element traversal). A reconfigurable iterator also may point to some first element and may determine when the reconfigurable iterator has exhausted all of the elements in a container. Depending on the programming language and intended use, reconfigurable iterators may also provide additional operations or exhibit different behaviors.

The primary purpose of a reconfigurable iterator is to allow a user to process every element of a container while isolating the user from the internal structure of the container. This enables the container to store elements in any manner while allowing the user to treat it as if it were a simple sequence or list. A reconfigurable iterator class may be designed in tight coordination with the corresponding container class. Usually the container provides the methods for creating the reconfigurable iterators. Reconfigurable iterators also provide a flexible way to filter, map and enrich realtime data on demand as it processes the data in the data flow 202. The memory model for handling the data flow 202 in the application framework is described in more detail below.

Within the context of the described embodiments, there are two generic types of reconfigurable iterators that may be employed in the application framework. A "data message iterator" and a "data iterator." For example, the message source 204 component of the data flow 202 takes the raw data as provided by the underlying messaging layers 212 and wraps the raw data in a data message iterator implementation in the form of the reconfigurable object 212-1. At the message source 204, there is no rectangular form imposed on the data, it is merely a collection of attribute and value pairs (attribute, value) that are grouped together by some form of configurable primary identifier. Attributes may be entities that define properties of objects, elements or files. Attributes may comprise of a name (or key) and a value. A value may be a number, literal string, array and anything that can be treated as if it were a number, for example. Examples of configurable primary identifiers may comprise a market symbol or trade identification. The message source 204 then provides the raw data wrapped in the data message iterator to the table 206 in the form of the reconfigurable object 212-2. The rectangular form is imposed on the data at the table 206. In particular, the table 206 may comprise a set of specified registered rows and columns and it matches these specifications to the incoming data. The end-result is that the table 206 passes the data to the data iterator, which is similar to the data message iterator except that it also provides accessors to retrieve structural information such as the row and column number for a particular update value.

For example, consider the following update (in pseudo-notation [key column value]): Morgan Stanley, trade price 100. At the data message iterator level all that is known is that there is an update for which the key is "Morgan Stanley" the column is "trade price" and the value is 100. Once the update has passed through the table 206, assuming that a row for "Morgan Stanley" and a column for "trade price" exists, the data iterator may be employed to determine that an update has occurred at a specified row or column. Optionally the rows and columns could be created.

Accordingly the reconfigurable objects 212-1, 212-2, 212-3, 212-4 or constructs may have their internal structure or state changed so that each one behaves like a completely different object without the need to actually create the different objects and then employ the garbage collector resources. Although creating the reconfigurable objects 212-1, 212-2, 212-3, 212-4 may have some known side effects, it prevents the necessary creation of other objects. In managed programming languages such as Java and .NET this reduces the amount of work for the garbage collector and improves performance. Thus, a particular reconfigurable object or construct may have its internal structure reconfigured to look like another instance of that object or construct. One benefit of this is that no garbage collection will be caused in languages that employ garbage collectors.

In object-oriented programming, the run time systems 116, 126 treat an object as an individual unit of run-time data storage that is used as the basic building block of programs. These objects act on each other, as opposed to a traditional view in which a program may be seen as a collection of functions, or as a list of instructions to the computer. Each object is capable of receiving messages, processing data and sending messages to other objects. Each object can be viewed as an independent little machine or actor with a distinct role or responsibility.

In object-oriented programming, the run time systems 116, 126 treat an instance of a program (i.e., a program running in a computer) as a dynamic set of interacting objects. Objects in the run time systems 116, 126 extend the more general notion of objects described above to include a very specific kind of typing. This typing allows for data members that represent the data associated with the object and methods to access the data members in predefined ways.

In the case of most objects, the data members may be accessed only through the method members, making it easy to guarantee that the data will always remain in a well-defined state (class invariants will be enforced). Some languages, however, do not make distinctions between data members and methods.

In a language where each object is created from a class, an object is called an instance of that class. If each object has a type, two objects with the same class would have the same data type. Creating an instance of a class is sometimes referred to as instantiating the class.

An object may be characterized by the following properties:

(1) Identity: the property of an object that distinguishes it from other objects;

(2) State: describes the data stored in the object; and (3) Behavior: describes the methods in the object interface by which the object can be used.

In one embodiment, the run time systems 116, 126 within the application framework may be configured or adapted to define and support the reconfigurable objects 212-1, 212-2, 212-3, 212-4 in the data flow 202. The reconfigurable objects 212-1, 212-2, 212-3, 212-4 may be implemented as the following "Foo" class reconfigurable object Foo. The field "variable" defines the state of the reconfigurable object and the method ReInitialize defines the interaction of the reconfigurable object Foo with the outside world. In pseudo-code:

```
class Foo
{
    int variable;
    void ReInitialize(int var)
    {
        variable = var;
    }
}
```

One example of reusing the reconfigurable object Foo over and over again to represent different actions is renewing the same object Foo rather than creating a new object for every mouse click. Another example is reusing the same reconfigurable object Foo rather than creating a new object for every incoming message from the network 102.

One area where it becomes important to optimize the reconfigurable objects 212-1, 212-2, 212-3, 212-4, 212-5 is with arrays. Arrays are common place and resetting them tends to require an object allocation in managed languages. However, in one embodiment, the array may be reset without allocating an object by defining integers that count how much of the array is used and then to only allocate a new array if the existing array is too small.

In one embodiment, a reconfigurable object may comprise the state of many similar or identical reconfigurable objects and presents an interface to the reconfigurable object; it also presents an interface to move through all of the many reconfigurable objects within the group. This enables many reconfigurable objects to be stored as one and reduces the creation of reconfigurable objects and therefore garbage collection.

One difference between the reconfigurable iterators and conventional iterators (e.g., XMLReader, Database iterators) is that the reconfigurable iterator (or a reconfigurable object)

and its behavior are still available rather than providing access to the data for copying at a particular point in time.

One example of a reconfigurable object Foo comprising an array may be represented by the following pseudo-code where the field "m_stuff" and an array "m_iterator" is reset to "0" and then the field "m_stuff" is used to count how much of the array is used:

```
class Foo
{
   int[ ] m_stuff;
   int m_iterator;
   void DoSomething( )
   {
      Log(m_stuff[m_iterator]);
   }
   void Reset( )
   {
      m_iterator = 0;
   }
   void Advance( )
   {
      ++m_stuff;
   }
}
```

Another feature of the reconfigurable object Foo is partially showing the data contained in an iterator (e.g., the "data message iterator" and/or the "data iterator"). For example, a portion of the data from the message source 204 may be shown to the client code/display 210 and another portion of the data may be shown to another client. Within an iterator, logic may be employed to show different portions of the dataset to different clients based on configuration. In one implementation, a bitmap may be employed to record which parts of the data the current client is supposed to see. This information may be used to determine which part of the dataset to advance to when the user asks for the next item.

In one embodiment bitmaps can be used to control the flow of iteration over a particular dataset in order to greatly improve performance.

As previously discussed, the application framework may be implemented as a generic layering framework. Thus, in such implementation setting up the data flow 202 essentially equates to configuring a set of layers. In the context of the application framework, the data flow 202 may be defined as a stack of layers from a bottom-most network layer to a top-most "view" layer.

The data flow 202 interacts via interfaces. The multiple components (e.g., the message source 204, the table 206 and the view 208) within the data flow 202 may implement the same interface. Accordingly, the multiple components (e.g., the message source 204, the table 206 and the view 208) within the data flow 202 know how to be managed and interact with each other to provide the correct end result. To interact with the data flow 202 as a coherent entity, a predetermined reconfigurable object or construct may be used to extract the top-most implementation of the interface in question.

The data flow 202 may be configured either as a caching or non-caching data flow. As previously discussed, the data flow 202 is the flow of the data as it is received by the message source 204 from the messaging layer 212 and passed to the table 206 and the view 208 to the client code/display 210 employing reconfigurable objects. The caching behavior of the data flow 202 may be determined by the implementation of the table 206. The application framework provides two implementations of the table 206, a caching implementation that caches all "subscribed" data as it passes through the table 206 and a non-caching implementation that does not cache any data.

Figure 3:
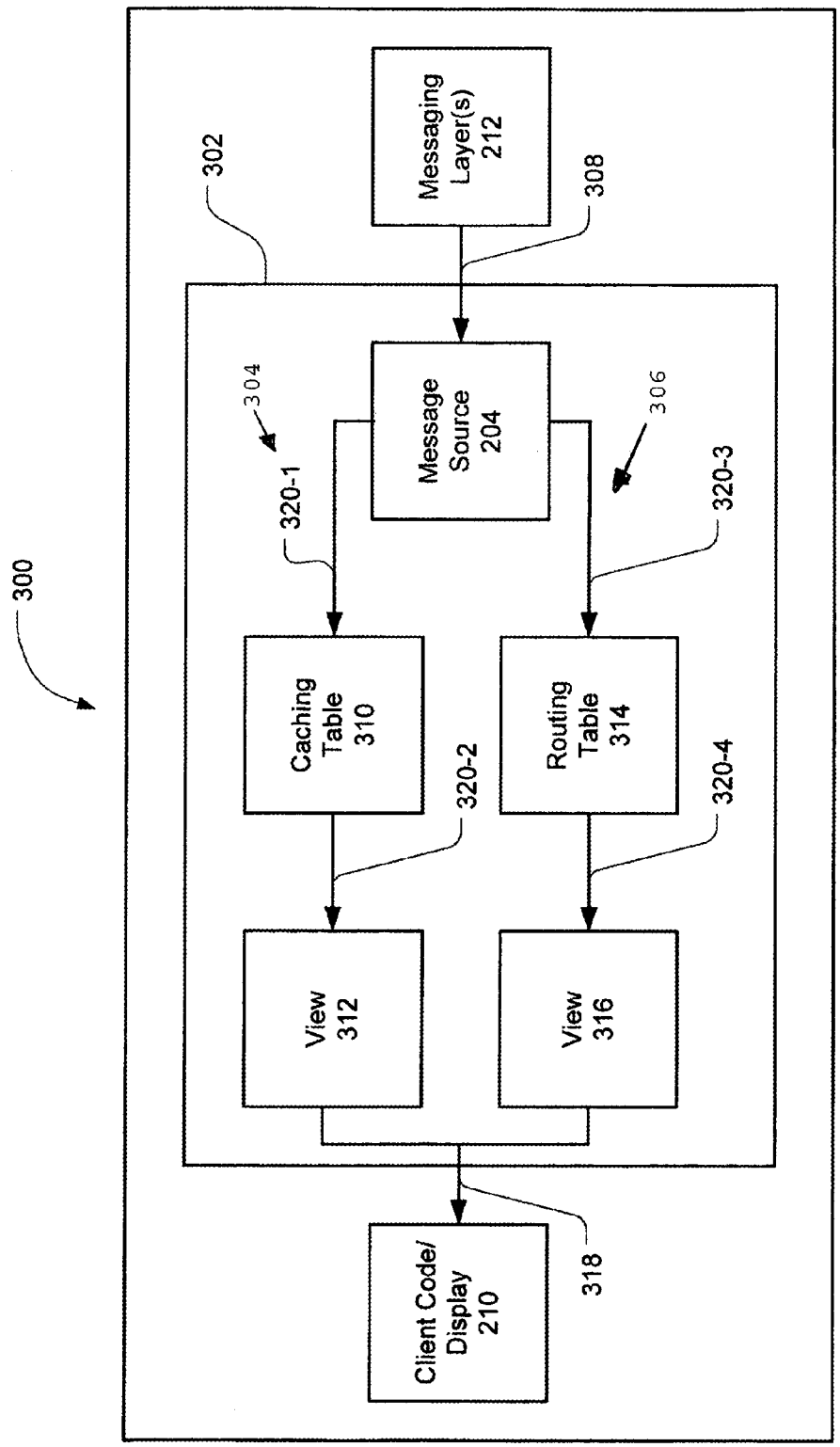
FIG. 3 is a block diagram illustrating one embodiment of a branched mixed-mode data flow on a runtime system in an application framework.

FIG. 3 is a block diagram 300 illustrating one embodiment of a branched mixed-mode data flow 302 on the runtime systems 116, 126 in an application framework. The mixed-mode data flow 302 using a single connection base flow in the form of a reconfigurable object 308 from the messaging source 202 to the messaging layer 212 with the data flow split into two branches, a caching flow branch 304 and a non-caching flow branch 306. A set of caching subscriptions may be managed through the caching flow branch 304, and a set of non-caching subscriptions through the non-caching flow branch 306. Each of these flow branches 304, 306 feed from the base flow 308. As previously described, information within the data flow 302 may be exchanged by employing reconfigurable objects or iterators 320-1, 320-2, 320-3, 320-4. Information is passed from the views 312, 316 to the client code/display 210 in the form of reconfigurable object 318.

In the caching flow branch 304, the message source 204 provides and stores the reconfigurable object 308 raw data received via the base flow from the messaging layer(s) 212 wrapped in the data message reconfigurable iterator 320-1 to a caching table 310. Once the wrapped data is stored in the caching table 310, future use can be made by accessing the cached copy of the wrapped data in the caching table 310 rather than re-fetching or re-computing the original data from the message source 204, in order to lower the average access time. The caching table 310 passes the wrapped data to the reconfigurable iterator 320-2 and a first view 312. The first view 312 in the caching flow branch 304 of the mixed-mode data flow 302 is a flow construct to restrict, transform or enrich the data as it propagates through the mixed-mode data flow 302. The first view 312 provides a constrained "view" over the caching table 310.

In the non-caching flow branch 306, the message source 202 provides and stores the reconfigurable object 308 raw data received via the base flow from the messaging layer(s) 212 wrapped in the data message reconfigurable iterator 320-3 to a routing table 314. The routing table 314 passes the wrapped data to the reconfigurable iterator 320-4 and a second view 316. The second view 316 in the non-caching flow branch 306 of the mixed-mode data flow 302 also may be a flow construct to restrict, transform or enrich the data as it propagates through the mixed-mode data flow 302. The second view 316 provides a constrained "view" over the routing table 314.

Figure 4:
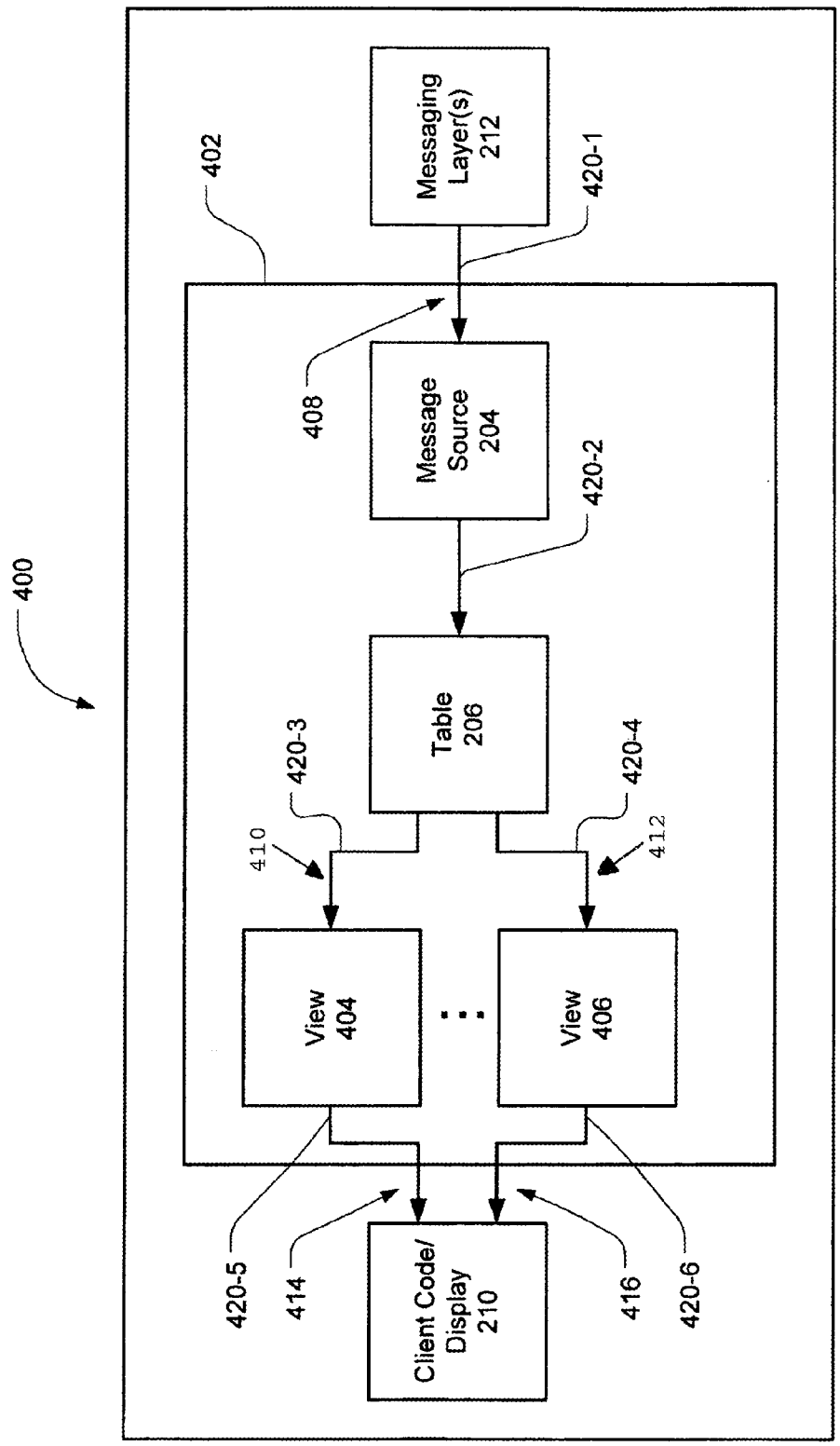
FIG. 4 is a diagram illustrating one embodiment of a multi-view data flow on a runtime system in an application framework.

FIG. 4 is a diagram 400 illustrating one embodiment of a multi-view data flow 402 on the runtime systems 116, 126 in an application framework. As previously described, information in the multi-view data flow 402 is exchanged employing reconfigurable objects and/or iterators. For example, information from the messaging layer 212 is received over a single connection 408 and is passed to the message source in the form of a reconfigurable object 420-1. From the message source 204 information is passed to the table 206 in the form of a reconfigurable object 420-2. The table 206 passes information to a view 404 over a connection 410 in the form of a reconfigurable object 420-3. In turn, the view 404 passes information to the client code/display 210 in the form of a reconfigurable object 420-5. Likewise, the table 206 passes information to another view 406 over another connection 412 in the form of a reconfigurable object 420-4. In turn, the view 406 passes information to the client code/display 210 in the form of a reconfigurable object 420-6.

In the implementation illustrated in FIG. 4, multiple custom views 404, 406 may be created over a larger subscription set. That is, for the single connection 408 to the messaging layer 212, a number of the multiple views 404, 406, for example, may be created with a disjoint or overlapping subscription set. Although two views 404, 406 are shown, it is contemplated that the multi-view data flow 402 may comprise two or more, or multiple, views. The client code/display 210 receives notifications from the multiple views 404, 406 when relevant updates occur via respective multiple connections 414, 416.

The multi-view data flow 402 may handle the flow subscription management. For example, if the multiple views 404, 406 are attached to the same table 206, the application framework internally manages the reference counts for any subscriptions. Subscribing to the same key from these multiple views 404, 406, the subscription remains "globally" active until the multiple views 404, 406 have unsubscribed. Furthermore, if only one of the multiple views 404 unsubscribes then that view 404 will stop propagating updates for that subscription, while the other view 406 will continue, for example.

The multiple views 404, 406 may be dynamically created and attached to the table 206 at runtime by the run time systems 116, 126. Accordingly, any temporary views can be built that mirror some current display and then tear it down once the display changes. This functionality may be provided through a predetermined interface. This interface provides three methods:

A further point to consider in this context is what happens when a key is subscribed to from one view 404 that made a subscription, where that key has already been subscribed to from another view 406 and the table 206 is caching. In this case, the run time systems 116, 126 within the respective application frameworks may not issue the cached value(s) as an immediate update to the view 404 that made the subscription.

Layers provided within the application framework in the run time system 116 may be thread safe, except for any predetermined exceptions. So as not to compromise the performance of the run time system 116, the exceptions are not made safe. Based on the particular network-threading model employed, these components may be made thread safe without synchronization from the perspective of an update thread. As such, so as not to penalize the use-case, where an initial table/view structure is setup (statically or dynamically using wildcards/greedy options) followed by no further user modifications, synchronization between the update thread and user threads may not be provided.

Figure 5:
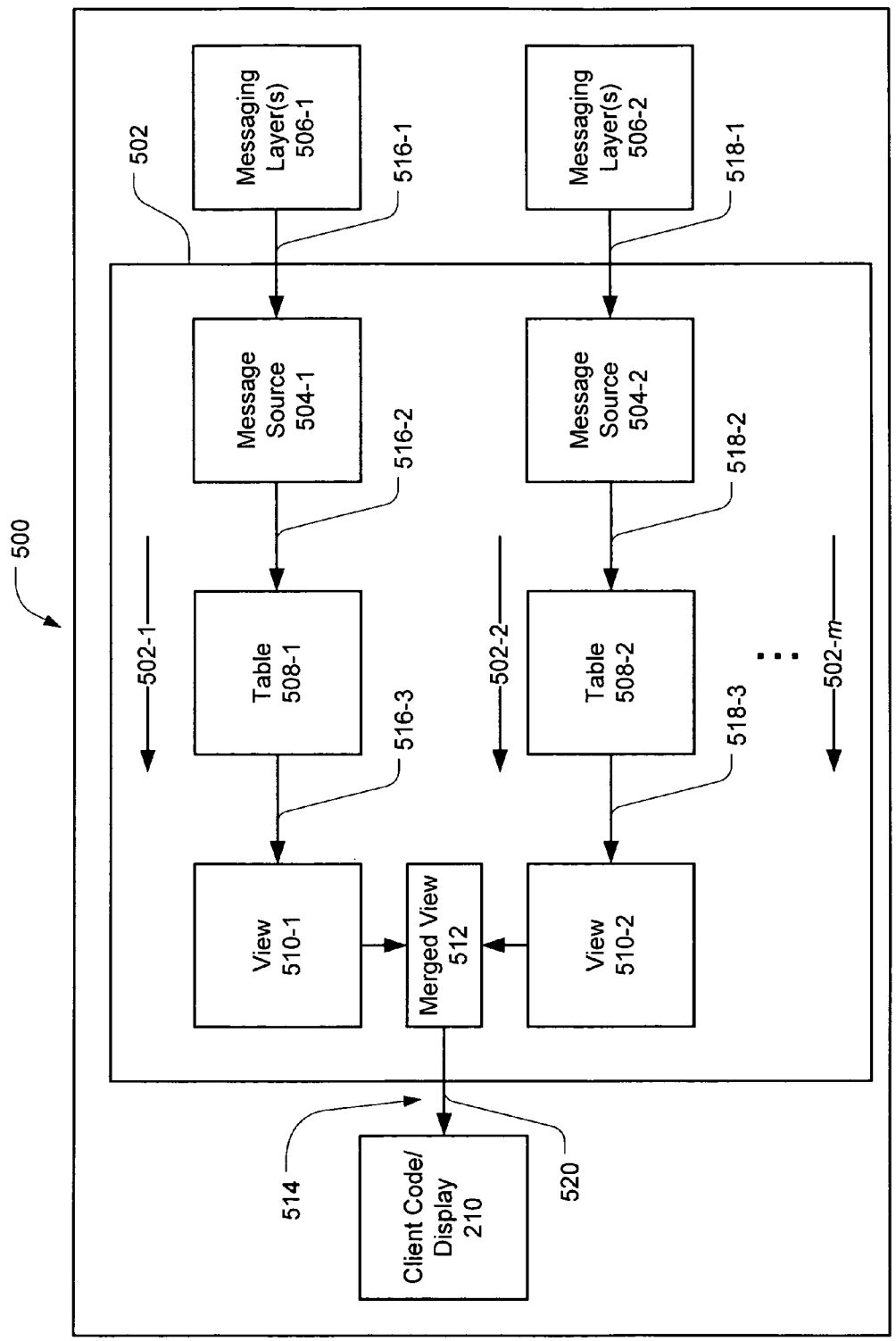
FIG. 5 is a diagram illustrating one embodiment of a merged view data flow on a run time system in an application framework.

FIG. 5 is a diagram 500 illustrating one embodiment of a merged view data flow 502 on the run time systems 116, 126 in an application framework. As previously discussed, the application framework may be employed to create straight data flows (e.g., the data flow 202 as shown in FIG. 2) and/or branched data flows (e.g., the branched data flow 302 as shown in FIG. 3 or the multi-view data flow 402 as shown in FIG. 4). The application framework and the run time systems 116, 126 also may provide functionality to merge the views of multiple data flows 502-*m*. The merged view multiple data flows 502-*m* may be implemented using foreign key concepts, for example. Up to m branches of data flows 502-*m* can be merged, where m is any integer.

In the illustrated embodiment, the run time systems 116, 126 on the application framework may be employed to support a two-way merger. However, the merger can be chained to create an m-way merger. In a primary data flow 502-1, a first message source 504-1 receives raw data from a first messaging layer 506-1 in the form of a reconfigurable object 516-1. Likewise, in a secondary data flow 502-2, a second message source 504-2 receives raw data from a second messaging layer 506-2 in the form of a reconfigurable object 518-1. The first message source 504-1 then provides the raw data wrapped in a first data message reconfigurable iterator 516-2 to a first table 508-1 in the primary data flow 502-1, and the second message source 504-2 then provides the raw data wrapped in a second data message reconfigurable iterator 518-2 to a second table 508-2 in the secondary data flow 502-2. A first view 510-1 provides a constrained view over the first table 508-1 via a reconfigurable iterator 516-3 and a second view 510-2 provides a constrained view over the second table 508-2 via a reconfigurable iterator 518-3. A merged view 512 may be created from the first and second views 510-1, 510-2, for example. A single connection 514 merger interface is provided to the client code/display 210 via a reconfigurable iterator 520.

Figure 6:
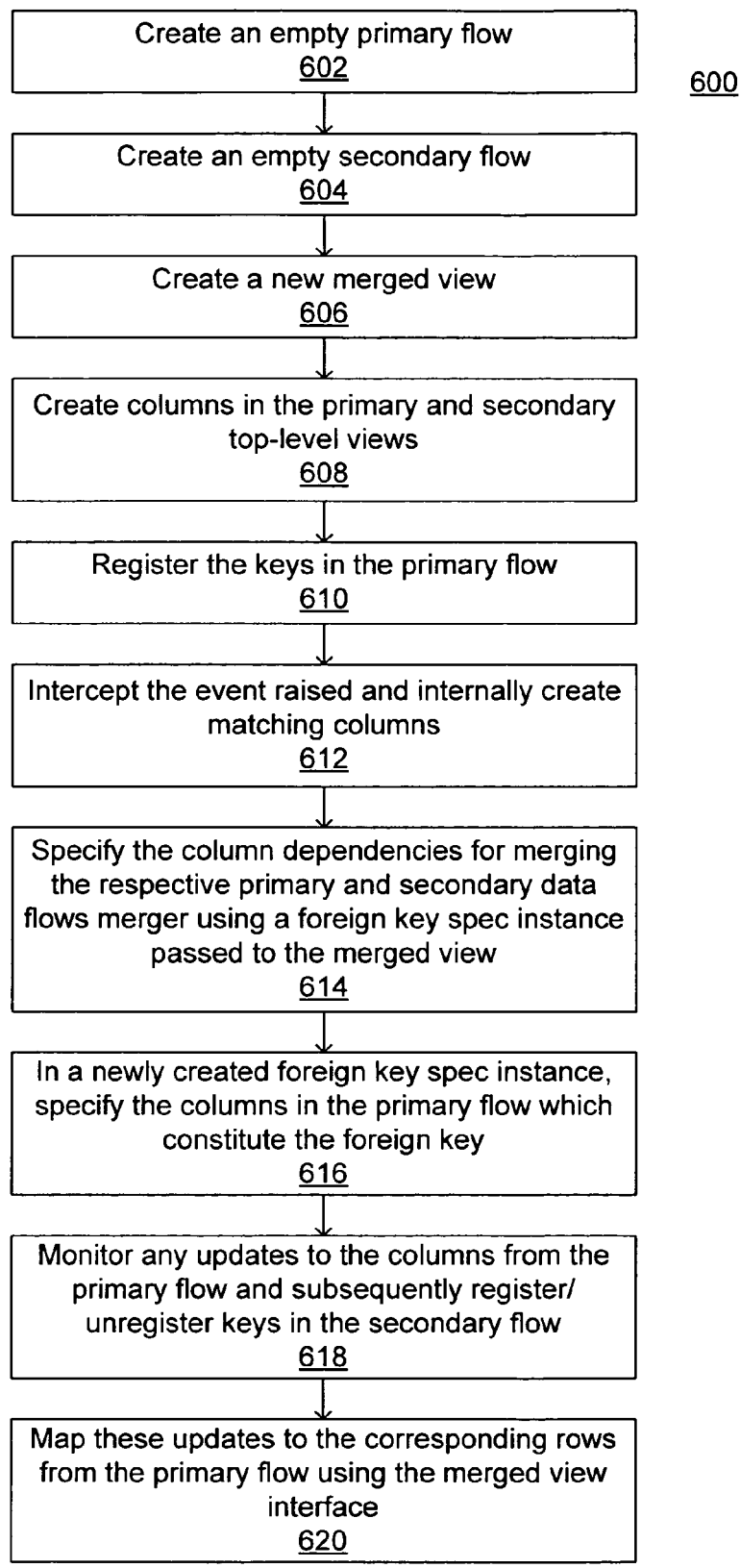
FIG. 6 illustrates one embodiment of a logic flow.

FIG. 6 illustrates one embodiment of a logic flow 600. To simplify the merger interface, the merged view 512 may be setup in accordance with the following logic flow. Create 602 an empty primary data flow 502-1 (or an empty top-level view on an existing flow). Create 604 an empty secondary data flow 502-2 (or an empty top-level view on an existing flow). Create 606 a new merged view 512 passing in the primary and secondary data flows 502-1, 502-2 along with a key builder interface implementation instance and a foreign key spec instance (these are described in more detail below). Create 608 the required columns in the primary and secondary top-level views 510-1, 510-2. Register 610 the keys in the primary data flow 502-1. While creating the required columns, a data merger interface may intercept 612 the event raised and internally create matching columns. As such, the merger will have a joint column structure in the primary and secondary data flows 502-1, 502-2 (of the top level views at least).

The foreign key spec instance passed to the merged view 512 on creation is used to specify 614 the column dependencies for merging the respective primary and secondary data flows 502-1, 502-2 merger. For example, in a newly created foreign key spec instance, specify 616 the columns in the primary data flow 502-1, which constitute the foreign key. The merged view 512 interface will then monitor 618 any updates to these columns from the primary data flow 502-1 and subsequently registers or unregisters keys in the secondary data flow 502-2. When updates for these keys arrive from the secondary data flow 502-2, the merged view 512 interface will map 620 these updates to the corresponding rows from the primary data flow 502-1.

An application framework key builder interface may be implemented for every custom merged view 512. This implementation is to create a new subscription key for the secondary data flow 502-2 given the current values of the columns specified in the foreign key spec instance. Thus a one-to-one mapping in terms of columns is not required between the foreign keys in the primary data flow 502-1 and the primary key in the secondary data flow 502-2. An implementation of the key builder is to combine or add to the values in the foreign key columns in any way it sees fit. The only requirement is that the key generated matches the primary columns as registered in the secondary message source 504-2.

In one embodiment, the merged view 512 implementation does not cache data locally. Rather, it may work entirely by virtual mappings. Accordingly, if a merged view 512 is created over two caching flows, data is not replicated, but rather the data is stored in each of the tables 508-1, 508-2 in the respective primary and secondary data flows 502-1, 502-2 in a de-normalized fashion and then is temporarily mapped only to a demand, whether it is an update or the client code/display 210 code attempting to read from the merged view 512 representation.

Accordingly, in a realtime merged view 512, a relationship between the two message sources 504-1, 504-2 can be defined using a notation similar to database logic. However, because the data in respect to the primary and secondary data flows 502-1, 502-2 are represented using the reconfigurable iterators 516-1-3 and 518-1-3, as previously discussed, there are no actual physical tables only virtual tables. Accordingly, the system can process multiple (e.g., thousands, millions, etc.) of updates per second.

In operation, each of the reconfigurable iterators 516-1-3 and 518-1-3 are re-shown in a different way in accordance with the mapping requirements of the data. So the original message sources 504-1, 504-2 may have described the data as coming from one column (e.g., column 7) in the merged view 512 that may map to another column (e.g., column 13). By layering an iterator over the original iterator an illusion that the iterator represents the merged view 512 may be created. However, there is no cost in resources in the merged view 512 because the remapping code is the wrapping iterator.

In one embodiment, the above implementation may be optimized by employing bitmaps to decide what to show to the users and only storing the current value of the primary/foreign key cells.

Figure 7:
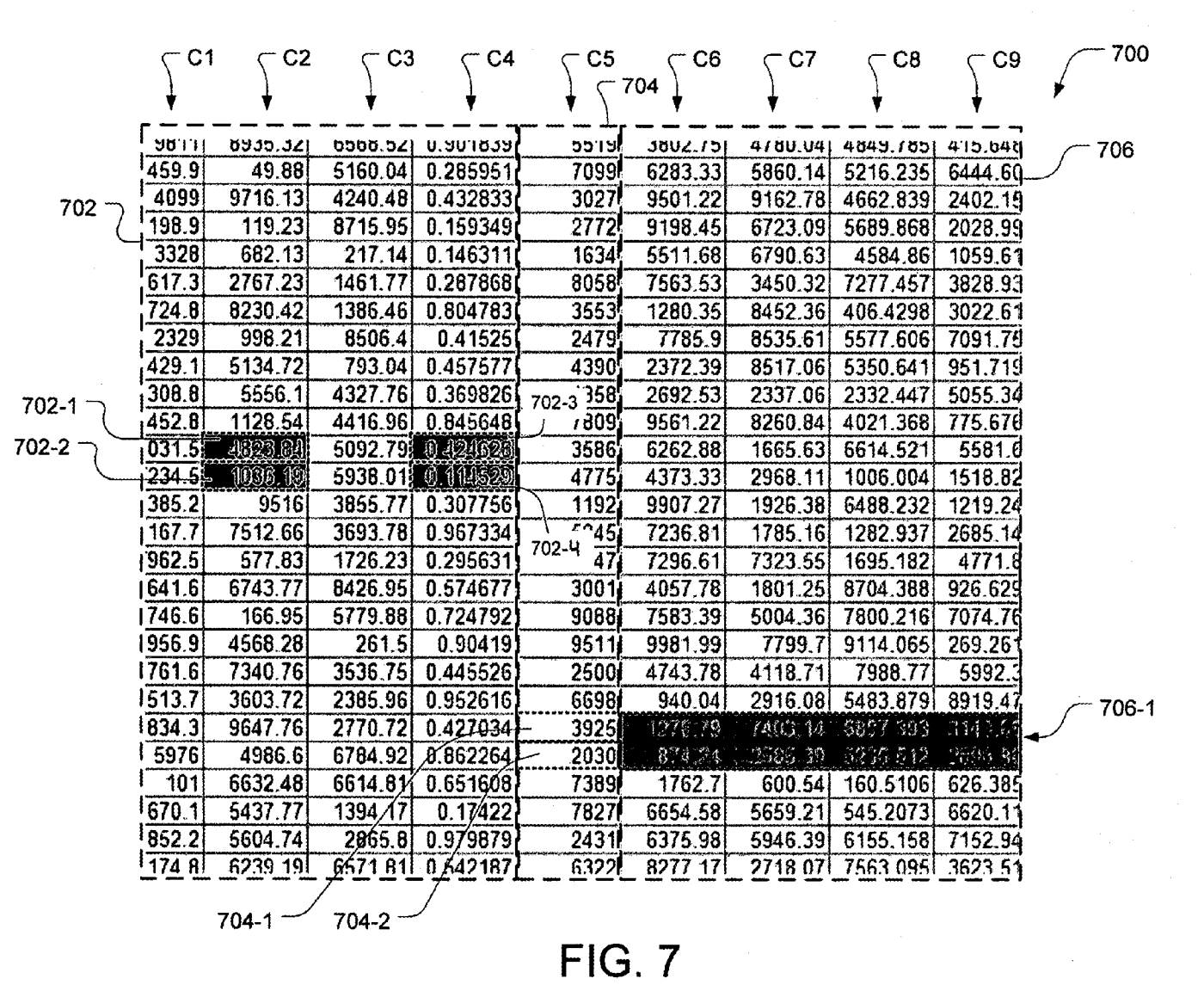

FIG. 7 is a diagram 700 that represents one embodiment of data that has been represented to the client code/display 210 via reconfigurable iterators. The client code/display 210 may display the data to a user on the GUI 128 associated with any of the client systems 106, 108, 110 shown in FIG. 1. The client code/display 210 will interpret the data as a single piece of data where a first set of values 702 are from the primary message source 504-1. A second set of values 704 form a primary key to a third set of values 706 that come from the secondary message source 504-2 (these values can be in any format, e.g., text, date time and necessarily just numbers as shown). Although this is the perceived value of the updates this is only an interpretation from the reconfigurable iterators described in the previous section.

In operation, parts of the update are coming in and being enriched. In the above example, values 702-1-4 in the first set of vales 702 may turn up in one update from the left hand source, the client code/display 210. The reconfigurable iterator of the left hand source would then be decorated so the client code/display 210 or consumer of the merged view 512 would see the values appearing in the 2nd and 4th columns C2, C4, respectively, and adjacent rows, even though they could come from completely different locations in the original message source 504-1. This may be achieved by having the row/column positions be lookups and converting these lookups in the decorator.

A fourth set of values 706-1 may arrive from within the same iterator and they may be passed to the client code/display 210 with the correct decorator so that the client code/display 210 sees them as coming from columns C6-C9. Also the client code/display 210 may see the correct row number. In one embodiment, the reconfigurable iterators from the secondary message source 504-2 need to be able to jump back to the key values 704-1, 704-2 (here 3925 and 2030). This is because if multiple values in the second set 704 (i.e., column C5) are the same as the values in the first set 702 (i.e., columns C1-C4) they will all need to be the same value. This may be achieved by continually playing the values back with different row representations. As a result the underlying reconfigurable iterator must be able to jump back so that it can be repeatedly decorated with different column numbers.

In one embodiment, merged view data flow 502 process may be further optimized by reusing the reconfigurable iterator objects and the iterator decorators and not recreate them every time.

The merged view 512 implementation stores the joining values 701-1 to determine whether they have changed. If they have changed then the secondary message source 504-2 is notified that the merged view 512 no longer requires updates on the key it previously specified and it needs to specify the new key which it now needs updates for. Reference counting is sometimes required because the foreign keys may not be unique.

It is also useful to have a view that is capable of temporarily caching a set of update iterator values in another reconfigurable iterator. This can then be processed in one pass instead of multiple passes as would be necessary without such a cache. In one embodiment this may be implemented by simply storing offsets to the underlying table and using them to retrieve the current values when required.

The examples presented herein are intended to illustrate potential and specific implementations of the present invention. It can be appreciated that the examples are intended primarily for purposes of illustration of the invention for those skilled in the art. No particular aspect or aspects of the examples is/are intended to limit the scope of the present invention.

It is to be understood that the figures and descriptions of the present invention have been simplified to illustrate elements that are relevant for a clear understanding of the present invention, while eliminating, for purposes of clarity, other elements. For example, certain operating system details and modules of network platforms are not described herein. Those of ordinary skill in the art will recognize, however, that these and other elements may be desirable in a typical processor, computer system or e-mail application, for example. However, because such elements are well known in the art and because they do not facilitate a better understanding of the present invention, a discussion of such elements is not provided herein.

In general, it will be apparent to one of ordinary skill in the art that at least some of the embodiments described herein may be implemented in many different embodiments of software, firmware and/or hardware. The software and firmware code may be executed by a processor or any other similar computing device. The software code or specialized control hardware which may be used to implement embodiments of the invention is not limiting. For example, embodiments described herein may be implemented in computer software using any suitable computer software language type such as, for example, C or C++ using, for example, conventional or object-oriented techniques. Such software may be stored on any type of suitable computer-readable medium or media such as, for example, a magnetic or optical storage medium. The operation and behavior of the invention embodiments may be described without specific reference to specific software code or specialized hardware components. The absence of such specific references is feasible, because it is clearly understood that artisans of ordinary skill would be able to design software and control hardware to implement the embodiments of the present invention based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (non-volatile) memory, an optical disk, magnetic tape, or magnetic disk. Furthermore, at least some of the processes may be programmed when the computer system is manufactured or stored on various types of computer-readable media. Such media may include any of the forms listed above with respect to storage devices and/or, for example, a carrier wave modulated, or otherwise manipulated, to convey instructions that may be read, demodulated/decoded, or executed by a computer or computer system.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semi-permanent, and/or semi-temporary. A computer-readable medium may further include one or more data signals transmitted on one or more carrier waves.

A "computer," "computer system" or "processor" may be, for example and without limitation, a wireless or wireline variety of a processor, microcomputer, minicomputer, server, mainframe, laptop, personal data assistant (PDA), wireless e-mail device (e.g., "BlackBerry" trade-designated devices), cellular phone, pager, processor, fax machine, scanner, or any other programmable device configured to transmit and/or receive data over a network. Computer systems and computer-based devices disclosed herein may include memory for storing certain software applications used in obtaining, processing and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM), and/or other computer-readable media.

In various embodiments of the present invention disclosed herein, a single component may be replaced by multiple components, and multiple components may be replaced by a single component, to perform a given function or functions. Except where such substitution would not be operative, such substitution is within the scope of the invention. Any servers described herein, for example, may be replaced by a "server farm" or other grouping of networked servers that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

While various embodiments of the invention have been described herein, it should be apparent that various modifications, alterations and adaptations to those embodiments may occur to persons skilled in the art with attainment of at least some of the advantages of the present invention. The disclosed embodiments are therefore intended to include all such modifications, alterations and adaptations without departing from the scope and spirit of the present invention as set forth herein.

The invention claimed is:

1. A method of controlling data flows within an application framework in a runtime system between a messaging layer and a client/code display, the application framework comprising a message source, a table, and a view, the method comprising:
executing, by a processor, runtime system instructions stored in a memory coupled to the processor for:
receiving a message from the messaging layer by the message source in a data flow, the message comprising first data from the messaging layer, wherein the message, when received from the messaging layer, comprises a plurality of associated attribute and value pairs;
encapsulating the first data in the message in a reconfigurable object;
providing the reconfigurable object to the table in the data flow, the table comprising a set of data elements organized in a plurality of rows and columns, wherein the columns are identified by name and the rows are identified by values appearing in a subset of the columns identified as a candidate key;
transforming the plurality of associated attribute and value pairs to rectangular form, wherein the subset of columns identified as the candidate key correspond to the attributes of the message;
providing a constrained view of the first data over the table, wherein the constrained view limits the visible rows and columns of the table;
receiving a second message from the messaging layer by the message source in the data flow, the second message comprising second data from the messaging layer;
reinitializing the reconfigurable object so as to encapsulate within the reconfigurable object the second data in the second message, wherein after the reinitializing, the reconfigurable object no longer encapsulates the first data;
providing the reconfigurable object to the table in the data flow; and
providing a constrained view of the second data over the table, wherein the constrained view limits the visible rows and columns of the table.

2. The method of claim 1, comprising:
providing the constrained view of the first data over the caching table and the routing table to a client code/display via a second reconfigurable object.

3. The method of claim 1, comprising:
providing a second constrained view of the first data over the table.

4. The method of claim 3, comprising:
providing the first and second constrained views of the first data over the table to a client code/display via a second reconfigurable object.

5. An apparatus, for controlling data flows within an application framework in a runtime system between a messaging layer and a client/code display, the application framework comprising a message source, a table, and a view, the apparatus comprising:
a memory having runtime system executable instructions stored therein; and
a processor coupled to the memory, wherein when executed by the processor, the runtime system instructions cause the processor to:
receive a message from the messaging layer by the message source in a data flow, the message comprising first data from the messaging layer, wherein the message, when received from the messaging layer, comprises a plurality of associated attribute and value pairs;

encapsulate the first data in the message in a reconfigurable object;

provide the reconfigurable object to the table in the data flow, the table comprising a set of data elements organized in a plurality of rows and columns, wherein the columns are identified by name and the rows are identified by values appearing in a subset of the columns identified as a candidate key;

transform the plurality of associated attribute and value pairs to rectangular form, wherein the subset of columns identified as the candidate key correspond to the attributes of the message;

provide a constrained view of the first data over the table, wherein the constrained view limits the visible rows and columns of the table;

receive a second message from the messaging layer by the message source in the data flow, the second message comprising second data from the messaging layer;

reinitialize the reconfigurable object so as to encapsulate within the reconfigurable object the second data in the second message, wherein after the reinitializing, the reconfigurable object no longer encapsulates the first data;

provide the reconfigurable object to the table in the data flow; and provide a constrained view of the second data over the table, wherein the constrained view limits the visible rows and columns of the table.

6. The apparatus of claim 5, comprising:
a client code/display coupled to the processor, wherein the instructions cause the processor to provide the constrained view over the caching table and the routing table to the client code/display via a second reconfigurable object.

7. The apparatus of claim 5, wherein the instructions cause the processor to: provide a second constrained view of the first data over the table.

8. The apparatus of claim 7, comprising:
a client/code display coupled to the processor, wherein the instructions cause the processor to provide the first and second constrained views of the first data over the table to a client code/display via a third reconfigurable object.

9. The apparatus of claim 5, comprising: a network socket coupled to the processor.

10. An article comprising a non-transitory computer readable medium having executable instructions stored thereon, which when executed by a processor cause the processor to:
receive a message from the messaging layer by the message source in a data flow, the message comprising first data from the messaging layer, wherein the message, when received from the messaging layer, comprises a plurality of associated attribute and value pairs;

encapsulate the first data in the message in a reconfigurable object;

provide the reconfigurable object to the table in the data flow, the table comprising a set of data elements organized in a plurality of rows and columns, wherein the columns are identified by name and the rows are identified by values appearing in a subset of the columns identified as a candidate key;

transform the plurality of associated attribute and value pairs to rectangular form, wherein the subset of columns identified as the candidate key correspond to the attributes of the message;

provide a constrained view of the first data over the table, wherein the constrained view limits the visible rows and columns of the tables;

receive a second message from the messaging layer by the message source in the data flow, the second message comprising second data from the messaging layer;

reinitialize the reconfigurable object so as to encapsulate within the reconfigurable object the second data in the second message, wherein after the reinitializing, the reconfigurable object no longer encapsulates the first data;

provide the reconfigurable object to the table in the data flow; and provide a constrained view of the second data over the table, wherein the constrained view limits the visible rows and columns of the table.

11. The article of claim 10, wherein the instructions cause the processor to:
provide the constrained view of the first data over the caching table and the routing table to a client code/display via a second reconfigurable object.

12. The article of claim 10, wherein the instructions cause the processor to: provide a second constrained view of the first data over the table.

13. The article of claim 12, wherein the instructions cause the processor to: provide the first and second constrained views of the first data over the table to a client code/display via a second reconfigurable object.

14. A method of controlling a mixed-mode data flow within an application framework in a runtime system between a messaging layer and a client/code display, the application framework comprising a message source, a caching table, and a first view in a caching flow branch; and a routing table and a second view in a routing flow branch, the method comprising:

executing, by a processor, runtime system instructions stored in a memory coupled to the processor for:
receiving a message from the messaging layer by the message source in a base data flow, the message comprising first data from the messaging layer, wherein the message, when received from the messaging layer, comprises a plurality of associated attribute and value pairs;

encapsulating the first data in the message in a reconfigurable object;

providing the reconfigurable object to the caching table in the caching data flow, the caching table comprising a set of data elements organized in a plurality of rows and columns, wherein the columns are identified by name and the rows are identified by values appearing in a subset of the columns identified as a candidate key;

transforming the plurality of associated attribute and value pairs to rectangular form, wherein the subset of columns identified as the candidate key correspond to the attributes of the message;

providing a constrained view of the first data over the caching table, wherein the constrained view over the caching table limits the visible rows and columns of the caching table;

receiving a second message from the messaging layer by the message source in the data flow, the second message comprising second data from the messaging layer;

reinitializing the reconfigurable object so as to encapsulate within the reconfigurable object the second data in the second message, wherein after the reinitializing, the reconfigurable object no longer encapsulates the first data;

providing the reconfigurable object to the caching table in the data flow; and providing a constrained view of the second data over the caching table, wherein the constrained view limits the visible rows and columns of the caching table.

15. An apparatus for controlling a mixed-mode data flow within an application framework in a runtime system between a messaging layer and a client/code display, the application framework comprising a message source, a caching table, and a first view in a caching flow branch; and a routing table and a second view in a routing flow branch, the apparatus comprising:

a memory having runtime system executable instructions stored therein; and a processor coupled to the memory, wherein when executed by the processor, the runtime system instructions cause the processor to:

receive a message from the messaging layer by the message source in a base data flow, the message comprising first data from the messaging layer, wherein the message, when received from the messaging layer, comprises a plurality of associated attribute and value pairs;

encapsulate the first data in the message in a reconfigurable object;

provide the reconfigurable object to the caching table in the caching data flow, the caching table comprising a set of data elements organized in a plurality of rows and columns, wherein the columns are identified by name and the rows are identified by values appearing in a subset of the columns identified as a candidate key;

transform the plurality of associated attribute and value pairs to rectangular form, wherein the subset of columns identified as the candidate key correspond to the attributes of the message; and provide a constrained view of the first data over the caching table, wherein the constrained view over the caching table limits the visible rows and columns of the caching table;

receive a second message from the messaging layer by the message source in the data flow, the second message comprising second data from the messaging layer;

reinitialize the reconfigurable object so as to encapsulate within the reconfigurable object the second data in the second message, wherein after the reinitializing, the reconfigurable object no longer encapsulates the first data;

provide the reconfigurable object to the caching table in the data flow; and provide a constrained view of the second data over the caching table, wherein the constrained view over the caching table limits the visible rows and columns of the caching table.

16. The apparatus of claim 15, comprising:
a network socket coupled to the processor.

17. An article comprising a non-transitory computer readable medium having executable instructions stored thereon, which when executed by a processor cause the processor to:

receive a message from the messaging layer by the message source in a base data flow, the message comprising first data from the messaging layer, wherein the message, when received from the messaging layer, comprises a plurality of associated attribute and value pairs;

encapsulate the first data in the message in a reconfigurable object;

provide the reconfigurable object to the caching table in the caching data flow, the caching table comprising a set of data elements organized in a plurality of rows and columns, wherein the columns are identified by name and the rows are identified by values appearing in a subset of the columns identified as a candidate key;

transform the plurality of associated attribute and value pairs to rectangular form, wherein the subset of columns identified as the candidate key correspond to the attributes of the message; and provide a constrained view of the first data over the caching table, wherein the constrained view over the caching table limits the visible rows and columns of the caching table;

receive a second message from the messaging layer by the message source in the data flow, the second message comprising second data from the messaging layer;

reinitialize the reconfigurable object so as to encapsulate within the reconfigurable object the second data in the second message, wherein after the reinitializing, the reconfigurable object no longer encapsulates the first data;

provide the reconfigurable object to the caching table in the data flow; and provide a constrained view of the second data over the caching table, wherein the constrained view over the caching table limits the visible rows and columns of the caching table.

* * * * *